(12) United States Patent
Stad et al.

(10) Patent No.: US 7,683,796 B2
(45) Date of Patent: Mar. 23, 2010

(54) OPEN WIRE DETECTION SYSTEM AND METHOD

(75) Inventors: Benjamin J. Stad, Cinnaminson, NJ (US); Sudhir Thalore, Willow Grove, PA (US)

(73) Assignee: Honeywell International Inc., Morristown, NJ (US)

( * ) Notice: Subject to any disclaimer, the term of this patent is extended or adjusted under 35 U.S.C. 154(b) by 840 days.

(21) Appl. No.: 11/542,973

(22) Filed: Oct. 4, 2006

(65) Prior Publication Data

US 2008/0084323 A1 Apr. 10, 2008

(51) Int. Cl.
G08B 21/00 (2006.01)
(52) U.S. Cl. .................. 340/652; 340/635; 340/664; 324/500; 324/523; 324/713; 324/718; 361/93.1
(58) Field of Classification Search ............. 340/652, 340/635, 500, 660, 661, 662, 663, 664; 324/500, 324/512, 522, 523, 713, 718; 361/87, 93.1
See application file for complete search history.

(56) References Cited

U.S. PATENT DOCUMENTS

| | | | |
|---|---|---|---|
| 3,590,370 A | 6/1971 | Fleischer | 324/51 |
| 4,841,286 A | 6/1989 | Kummer | 340/653 |
| 5,235,527 A | 8/1993 | Ogawa et al. | 364/571.05 |
| 5,294,890 A | 3/1994 | Hemminger et al. | 324/549 |
| 5,471,144 A | 11/1995 | Meyer | |
| 5,703,575 A | 12/1997 | Kirkpatrick | 340/870.17 |
| 6,130,795 A | 10/2000 | Freitas et al. | |
| 6,265,881 B1 * | 7/2001 | Meliopoulos et al. | 324/691 |
| 6,324,040 B1 | 11/2001 | Saladin et al. | 361/86 |
| 6,337,570 B1 | 1/2002 | Audren et al. | |
| 6,525,918 B1 * | 2/2003 | Alles et al. | 361/93.1 |
| 7,018,800 B2 * | 3/2006 | Huisenga et al. | 435/6 |
| 7,098,798 B2 * | 8/2006 | Huisenga et al. | 340/635 |
| 7,236,338 B2 * | 6/2007 | Hale et al. | 361/42 |
| 7,518,529 B2 * | 4/2009 | O'Sullivan et al. | 340/870.27 |

OTHER PUBLICATIONS

*4-20mA Current Loop Primer*, DMS Application Note, Datel, Inc.

* cited by examiner

*Primary Examiner*—Davetta W Goins
(74) *Attorney, Agent, or Firm*—Kermit D. Lopez; Luis M. Ortiz

(57) ABSTRACT

An open-wire detection system and method includes a current transmitter that can be connected to one or more wires, wherein the current transmitter provides a minimum current and/or a current that is greater than the minimum current. An anti-aliasing filter is connected to an analog-to-digital converter, such that the anti-aliasing filter receives the minimum current provided by the current transmitter and provides an output signal to the analog-to-digital converter. A noise filter is generally connected to an open-wire threshold detector, wherein the noise filter and the open-wire threshold detector permit detection of input levels below the minimum current provided by the current transmitter. An output from the open-wire threshold detector can be sampled multiple times at intervals that correlate with a frequency of a plurality of digital signals to produce sampled data, such that if the sampled data is below the minimum current, one or more of the wires (e.g., a return field wire and/or a field wire connected to a power supply) is reported as constituting an open-wire.

20 Claims, 3 Drawing Sheets

OPEN WIRE DETECTION SYSTEM AND METHOD

TECHNICAL FIELD

Embodiments are generally related to high-level analog field transmitters and process control systems. Embodiments are also related to open wire detection techniques and devices. Embodiments are also related to sensor diagnostic methods and systems.

BACKGROUND

The most common method used to interface high-level analog field transmitters to a process control system is the 4-20 mA current loop. A 4-20 mA current loop can be implemented as a point-to-point or multi-drop circuit mainly used in the process automation field to transmit signals from instruments and sensors in the field to a controller. It sends an analog signal from 4 to 20 mA that represents 0 to 100% of some process variable. As a current loop signal, 4-20 mA also powers the sensor transmitter on the same wire pair, and 4-20 mA provides increased immunity against interference than a voltage-based line.

FIG. 1 illustrates a schematic diagram of a prior art system 100 that includes a 4-20 mA current loop 101. The configuration of system 100 depicted in FIG. 1 represents a common technique for transmitting sensor information via a sensor 106 in many industrial process-monitoring applications, including the use of a sensor to measure physical parameters such as temperature, pressure, speed, liquid flow rates, etc. Transmitting sensor information via the current loop 101 is particularly useful when the information has to be sent to a remote location over long distances (e.g., 1000 feet, or more).

System 100 generally includes sensor 106 in association with a transmitter 102, a power supply 108, and a process monitor/controller component 104 that includes an anti-aliasing filter 118 that is connected to and provides a signal to an Analog-to-Digital Converter (ADC) 120, which in turn provides a signal to a control system or control device 121. The transmitter 102 typically includes electronic circuitry 110, in communication with sensor 106. The operation of system 100 and its loop 101 is fairly straightforward: the output signal from sensor 106 is first converted to a corresponding current via the electronic circuitry 110, with, for example, 4 mA normally representing the zero-level output of sensor 106, and 20 mA, for example, representing the full-scale output of sensor 106. Then, a receiver at the remote end converts the 4-20 mA current into a voltage which in turn can be further processed by the process monitor/controller component 104.

Transmitting an output of sensor 106 as a voltage over long distance, however, has several drawbacks. Unless very high input-impedance devices are used, transmitting voltages over long distances produces correspondingly lower voltages at the receiving end due to wiring and interconnect resistances. High-impedance instruments, however, can be sensitive to noise pickup since the lengthy signal-carrying wires often run in close proximity to other electrically noisy system wiring. Shielded wires can be used to minimize noise pickup, but their high cost may be prohibitive when long distances are involved. Sending a current over long distances produces voltage losses proportional to the wiring's length. However, these voltage losses—also known as "loop drops"—do not reduce the 4-20 mA current as long as the transmitter and loop supply can compensate for these drops. The magnitude of the current in the loop 101 is not affected by voltage drops in the wiring of system 100 since all of the current (i.e., electrons) originating at the negative (−) terminal of the loop power supply has to return back to its positive (+) terminal.

In a configuration such as system 100 and loop 101, the transmitter varies the current to communicate the process variable. At the receiving end, the current is converted to a voltage by passing it through a precision resistor. This voltage is filtered to remove noise and prevent frequency aliasing, then periodically converted (at a frequency called the "scan rate" or "sampling rate") to a digital value and passed to the control system of control component 104.

If the field wiring opens, the current will drop to zero virtually instantly. The output of the anti-aliasing filter, however, drops at a rate determined by its time constant. This can result in control action on some number of bad input values before the control system can detect the open-wire condition.

It is believed that a solution to these problems can be achieved through the design and implementation of a new and novel technique for detecting an open wire detection by sensing the input signal with two different frequency responses at two or more different locations within the input circuit. Such a technique, including a method and system thereof, is described in greater detail herein.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide an apparatus and a method which overcomes the above noted prior art limitations.

It is another aspect of the present invention to provide an improved open-wire detection system and methodology.

It is an additional aspect of the present invention to provide for a system and method for open-wire detection in which bad process value propagation is eliminated from an analog input field device in association with a process control system.

The aforementioned aspects of the invention and other objectives and advantages can now be achieved as described herein. An open-wire detection system and method is disclosed. In general, a current transmitter can be connected to one or more wires, wherein the current transmitter provides a minimum current and/or a current that is greater than the minimum current. An anti-aliasing filter is connected to an analog-to-digital converter, such that the anti-aliasing filter receives the minimum current provided by the current transmitter and provides an output signal to the analog-to-digital converter. A noise filter is generally connected to an open-wire threshold detector, wherein the noise filter and the open-wire threshold detector permit detection of input levels below the minimum current provided by the current transmitter. An output from the open-wire threshold detector can be sampled multiple times at intervals that correlate with a frequency of a plurality of digital signals to produce sampled data, such that if the sampled data is below the minimum current, one or more of the wires (e.g., a return field wire and/or a field wire connected to a power supply) is reported as constituting an open-wire.

The noise filter reduces high-frequency noise, and contains a time constant selected to be small with respect to a scan rate associated with the analog-to-digital converter. The current transmitter preferably comprises a 4-20 mA transmitter. Additionally, a control system can be provided, which receives at least one signal from the analog-to-digital converter and at least one signal from the open-wire threshold detector. The control system can be composed of a processor and a module executed by the processor, the module and the processor being operable in combination with one another to monitor and control the open-wire threshold detector, the noise filter, the anti-aliasing filter and/or the analog-to-digital converter.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate at least one embodiment of the present invention and are not intended to limit the scope of the invention.

Figure 1:
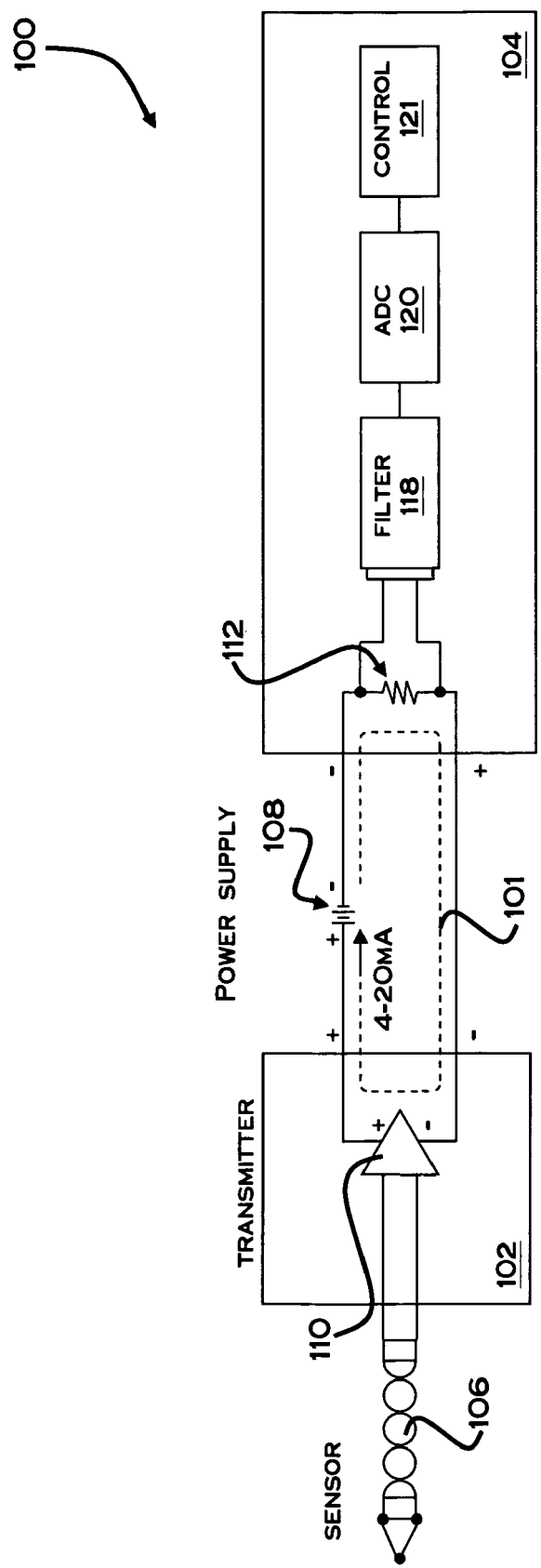
FIG. 1 illustrates a schematic diagram of a prior art system that includes a 4-20 mA current loop.
Figure 2:
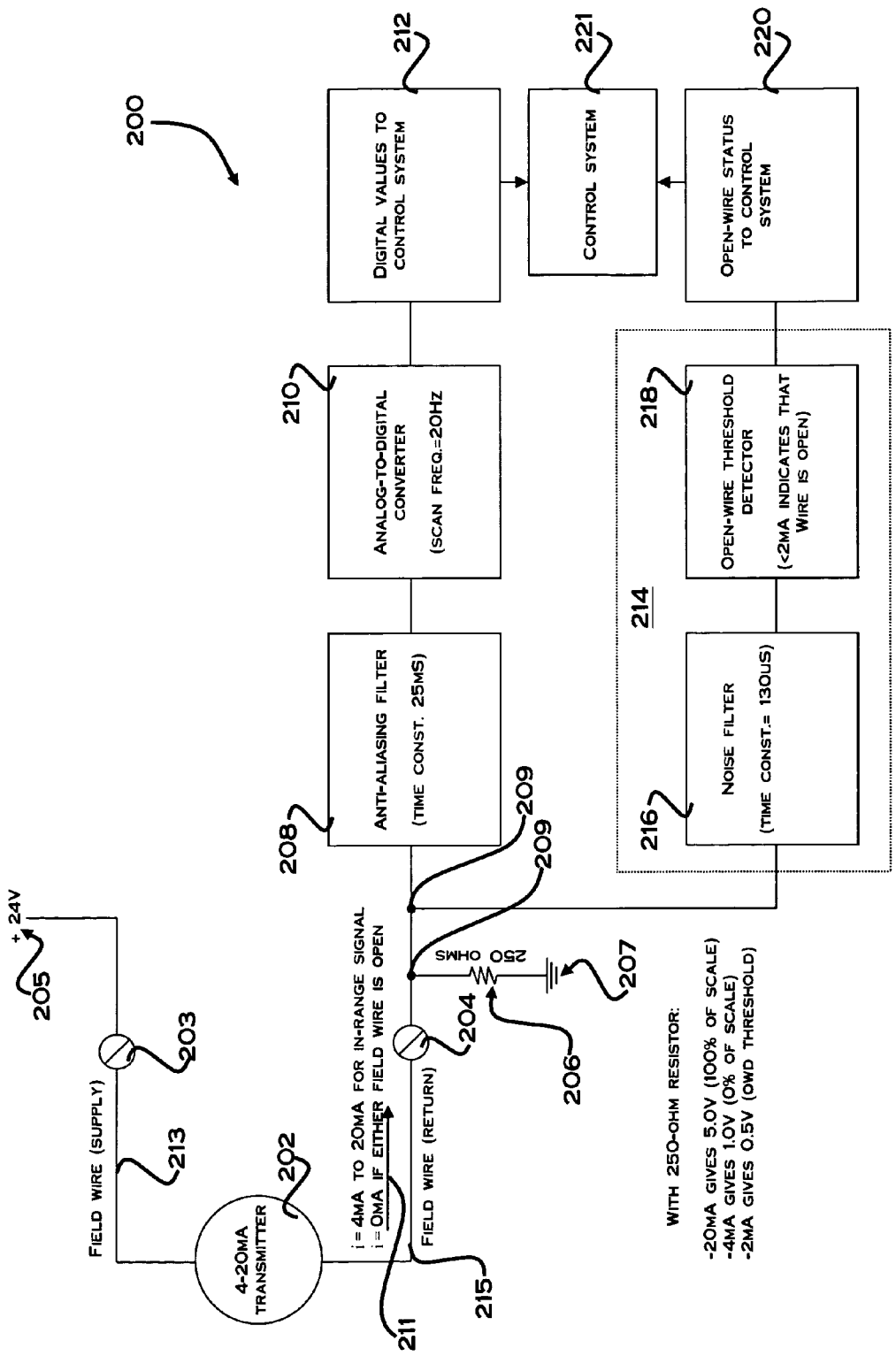
FIG. 2 illustrates a schematic diagram of an open-wire detection system that can be implemented in accordance with a preferred embodiment.

FIG. 2 illustrates a schematic diagram of an open-wire detection system 200 that can be implemented in accordance with a preferred embodiment. System 200 generally includes a 4-20 mA transmitter 202 in association with a voltage supply 205, and terminals 203 and 204 connecting the transmitter to the control system 221. Note that terminals 203, 204 are each depicted in FIG. 2 by a symbol composed of a circle with a 45 degree line. Such a symbol represents screw terminals that can be used to connected field wiring to the control system 221. Thus, a supply field wire 213 electrically connects the transmitter 202 to the terminal 203 and the voltage supply 205. A current 211 is transmitted electrically from transmitter 202 over a return field wire 215 to terminal 204. Note that in one embodiment, the current 211 may be 4 mA to 20 mA for in-range signals. The current 211 will be 0 mA if either field wire is open, that is, if a broken wire or bad connection interrupts the current 211.

A resistor 206 is connected electrically to ground 207 and to a node 209, which in turn is connected to an anti-aliasing filter 208 and a noise filter 216. A suggested time constant associated with the anti-aliasing filter is approximately 25 mS. It can be appreciated, of course that the 25 mS value is merely a suggested value and does not constitute a limiting feature of the present design but is provided for general illustrative purposes only. The resistor 206 preferably possesses a resistance of 250 Ohms. It can be appreciated, however, that this resistance value may vary depending upon design considerations and goals and is not considered a limiting feature of the present invention. With a 250 Ohm resistor, 20 mA gives 5.0 V (100% of scale), while 4 mA provides 1.0 V (0% of scale). 2 mA provides 0.5 V (OWD threshold).

The anti-aliasing filter 208, with a suggested time constant of 25 mS produces an output that is fed to an analog-to-digital converter 210, which can operate with a suggested scanning frequency of 20 Hz. Again, it can be appreciated that the 20 Hz value is merely a suggested value and does not constitute a limiting feature of the present design but is provided for general illustrative purposes only. Other values are possible, depending upon design considerations.

The output from the analog-to-digital converter (ADC) 210 can then be provided as digital signal values to a control system 221. The noise filter 216 can operate with a suggested time constant of 130 µS. The output from noise filter 216 is electrically transmitted to an open-wire threshold detector 218. Note that in some embodiments, a current of less than 2 mA can indicate that the wire is open. The noise filter 216 and the open-wire threshold detector 218 together can comprise a module 214 for performing open-wire detector operations. The open-wire status can then be transmitted to the control system 211, which can be provided in the form of software that monitors and controls the open-wire detection hardware, such as, for example, the open-wire threshold detector 218 and/or the noise filter 216.

System 200 generally provides a means of rapidly detecting current levels below a minimum current that the functioning transmitter 202 can provide. In the configuration of system 200, this threshold can be selected for best immunity to noise, midway between the 4 mA bottom of the scale and the 0 mA that would flow if a wire were open. If high levels of noise are expected, or if the input wires also carry digital communication, an appropriate noise filter 216 can be provided. In the configuration of system 200, the noise filter 216 has a time constant of 130 µS, which is appropriate for a digital signal of 1200 Hz or higher.

Software to monitor and control the open-wire detection hardware, and to determine whether to publish or disqualify the data from each analog-to-digital conversion provided by the analog-to-digital converter 210. The analog-to-digital converter 210 and the open-wire threshold detector 218 can be synchronized during or after every analog-to-digital conversion, and the OWD (Open Wire Detection) status can be checked. If the wire is open, the control system 221 reports a bad input rather than propagating the value measured by the analog-to-digital converter 210.

In a multiplexed system, if the ADC 210 and OWD 218 hardware use different multiplexers, and if the OWD 218 check is performed after the ADC 210 conversion, the converted value of the ADC 210 is held until the OWD 218 check is performed, and is published only if the OWD 218 check indicates that the wire is good. In systems where digital communication is also present, the OWD 218 status can be checked multiple times, at intervals consistent with the data rate, to prevent a false open-wire indication when the digital waveform is at its lowest point. In the particular embodiment depicted in FIG. 2, the OWD 218 status can be checked five times over a 1-mS period, and the wire can be reported as open only if all five are below the threshold. This configuration guarantees that at least one sample will occur when the digital waveform is above its centerline, which prevents the digital waveform from generating a false alarm.

System 200 can thus be utilized to detect the open wire condition by sensing the input signal with two different frequency responses, at two different locations within the input circuit. The main analog-to-digital converter (ADC) 210 can be placed after the anti-aliasing filter 208, and a second, faster sensing device can be added before the filter 208 to allow the system 200 to detect input levels below the minimum current that the functioning transmitter 202 can provide. The noise filter 216 is generally provided to reduce high-frequency noise (i.e., including digital communication that may be present along with the analog signal), but this filter's time constant can be selected to be small compared to the main ADC 210 scan rate or sample rate. Note that the scan rate typically relates to multiplexed systems and the sample rate relates to non-multiplexed systems.

The output of the noise filter 216 can be sampled multiple times, at intervals designed to correlate with the frequency of any digital communication that may be present. If all of these samples are below the minimum current threshold, the wire is reported to be open. Synchronization between the OWD detector 218 and the main ADC 210, along with the faster response thereof, guarantees identification of the open-wire condition before any bad data is propagated.

Figure 3:
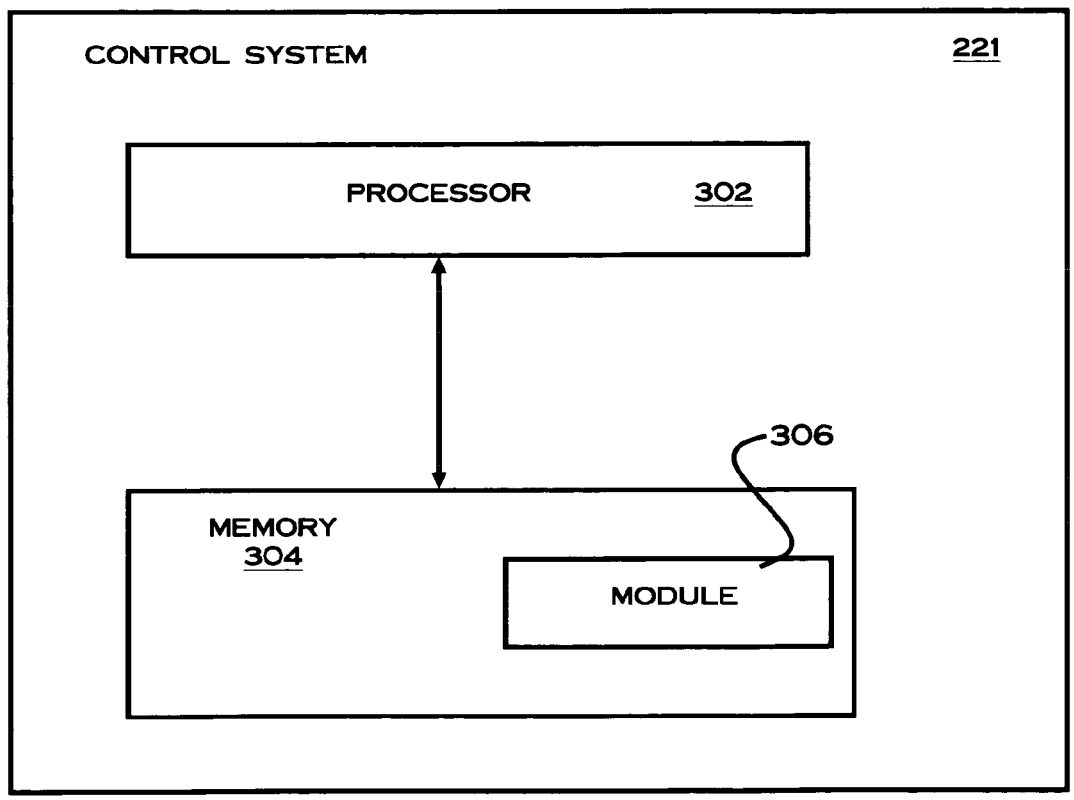
FIG. 3 illustrates a block diagram of the control system depicted in FIG. 2 in accordance with a preferred embodiment.

FIG. 3 illustrates a block diagram of the control system 221 depicted in FIG. 2 in accordance with a preferred embodiment. Note that control system 221 can be provided in the context of a software module 306 that is stored in a memory 304 and which can be retrieved and processed by a processor 302. In general, control system 221 can be provided as an apparatus composed of one or more processor readable storage devices (e.g., memory 304) having a processor readable code (e.g., software module 306) embodied on one or more of the processor readable storage devices, the processor readable code for programming one or more processors (e.g., 302) to perform a particular activity.

Note that the embodiments disclosed herein can be implemented in the context of a host operating system and one or more module(s) such as module 306. In the computer programming arts, a software module can be typically implemented as a collection of routines and/or data structures that perform particular tasks or implement a particular abstract data type. Software modules generally comprise instruction media storable within a memory location of a data-processing apparatus and are typically composed of two parts. First, a software module may list the constants, data types, variables, routines and the like that can be accessed by other modules or routines. Second, a software module can be configured as an implementation, which can be private (i.e., accessible perhaps only to the module), and that contains the source code that actually implements the routines or subroutines upon which the module is based. The term module, as utilized herein can therefore refer to software modules or implementations thereof. Such modules can be utilized separately or together to form a program product that can be implemented through signal-bearing media, including transmission media and recordable media.

Although the control system 221 can be implemented in the context of a fully functional data-processing apparatus, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal bearing media include, but are not limited to, recordable-type media such as floppy disks or CD ROMs and transmission-type media such as analogue or digital communications links.

Any type of computer-readable media that can store data that is accessible by a computer, such as magnetic cassettes, flash memory cards, digital versatile discs (DVDs), Bernoulli cartridges, random access memories (RAMs), and read only memories (ROMs) can be used in connection with the embodiments.

It is contemplated that the use of the present invention can involve components having different characteristics. It is intended that the scope of the present invention be defined by the claims appended hereto, giving full cognizance to equivalents in all respects.

What is claimed is:

1. An open-wire detection system, comprising:
   a current transmitter connected to at least one wire, wherein said current transmitter provides a minimum current;
   an anti-aliasing filter connected to an analog-to-digital converter, wherein said anti-aliasing filter receives said minimum current provided by said current transmitter and provides an output signal to said analog-to-digital converter; and
   a noise filter connected to an open-wire threshold detector, wherein said noise filter and said open-wire threshold detector permit detection of input levels below said minimum current provided by said current transmitter, wherein an output from said open-wire threshold detector is sampled multiple times at intervals that correlate with a frequency of a plurality of digital signals to produce sampled data, such that if said sampled data is below said minimum current, said at least one wire is reported as constituting an open-wire.

2. The system of claim 1 wherein said at least one wire comprises a field wire connected to a voltage supply.

3. The system of claim 1 wherein said at least one wire comprises a return field wire.

4. The system of claim 1 wherein said noise filter reduces high-frequency noise, such that said noise filter contains a time constant selected to be small with respect to a scan rate or a sample rate associated with said analog-to-digital converter.

5. The system of claim 1 wherein said current transmitter comprises a 4-20 mA transmitter.

6. The system of claim 1 further comprising a control system that receives at least one signal from said analog-to-digital converter and at least one signal from said open-wire threshold detector.

7. The system of claim 6 wherein said control system comprises:
   a processor;
   a module executed by said processor, said module and said processor being operable in combination with one another to monitor and control said open-wire threshold detector, said noise filter, said anti-aliasing filter and/or said analog-to-digital converter.

8. The system of claim 6 further comprising a plurality of screw terminals for connecting said at least one wire to control system.

9. An open-wire detection system, comprising:
   a 4-20 mA current transmitter connected to at least one wire, wherein said 4-20 mA current transmitter provides a minimum current;
   an anti-aliasing filter connected to an analog-to-digital converter, wherein said anti-aliasing filter receives said minimum current provided by said 4-20 mA current transmitter and provides an output signal to said analog-to-digital converter;
   a noise filter connected to an open-wire threshold detector, wherein said noise filter and said open-wire threshold detector permit detection of input levels below said minimum current provided by said 4-20 mA current transmitter, wherein an output from said open-wire threshold detector is sampled multiple times at intervals that correlate with a frequency of a plurality of digital signals to produced sampled data, such that if said sampled data is below said minimum current, said at least one wire is reported as constituting an open-wire; and a control system that receives at least one signal from said analog-to-digital converter and at least one signal from said open-wire threshold detector.

10. The system of claim 9 wherein said at least one wire comprises a field wire connected to a voltage supply.

11. The system of claim 9 wherein said at least one wire comprises a return field wire.

12. The system of claim 9 wherein said at least one wire comprises at least one field wire connected to a voltage supply and at least one return field wire.

13. The system of claim 9 wherein said noise filter reduces high-frequency noise, such that said noise filter contains a time constant selected to be small with respect to a scan rate or a sample rate associated with said analog-to-digital converter.

14. The system of claim 9 wherein said control system further comprises:
a processor; and
a module executed by said processor, said module and said processor being operable in combination with one another to monitor and control said open-wire threshold detector, said noise filter, said anti-aliasing filter and/or said analog-to-digital converter.

15. An open-wire detection method, comprising:
connecting a current transmitter to at least one wire, wherein said current transmitter provides a minimum current;
connecting an anti-aliasing filter an analog-to-digital converter, wherein said anti-aliasing filter receives said minimum current provided by said current transmitter and provides an output signal to said analog-to-digital converter; and
connecting a noise filter to an open-wire threshold detector, wherein said noise filter and said open-wire threshold detector permit detection of input levels below said minimum current provided by said current transmitter, wherein an output from said open-wire threshold detector is sampled multiple times at intervals that correlate with a frequency of a plurality of digital signals to produced sampled data, such that if said sampled data is below said minimum current, said at least one wire is reported as constituting an open-wire.

16. The system of claim 15 wherein said at least one wire comprises a field wire connected to a voltage supply and a return field wire.

17. The method of claim 15 wherein said noise filter reduces high-frequency noise, such that said noise filter contains a time constant selected to be small with respect to a scan rate or a sample rate associated with said analog-to-digital converter.

18. The method of claim 15 wherein said current transmitter comprises a 4-20 mA transmitter.

19. The system of claim 15 further comprising a control system that receives at least one signal from said analog-to-digital converter and at least one signal from said open-wire threshold detector.

20. The method of claim 19 wherein said control system comprises:
a processor;
a module executed by said processor, said module and said processor being operable in combination with one another to monitor and control said open-wire threshold detector, said noise filter, said anti-aliasing filter and/or said analog-to-digital converter.

* * * * *